Patented Apr. 12, 1932

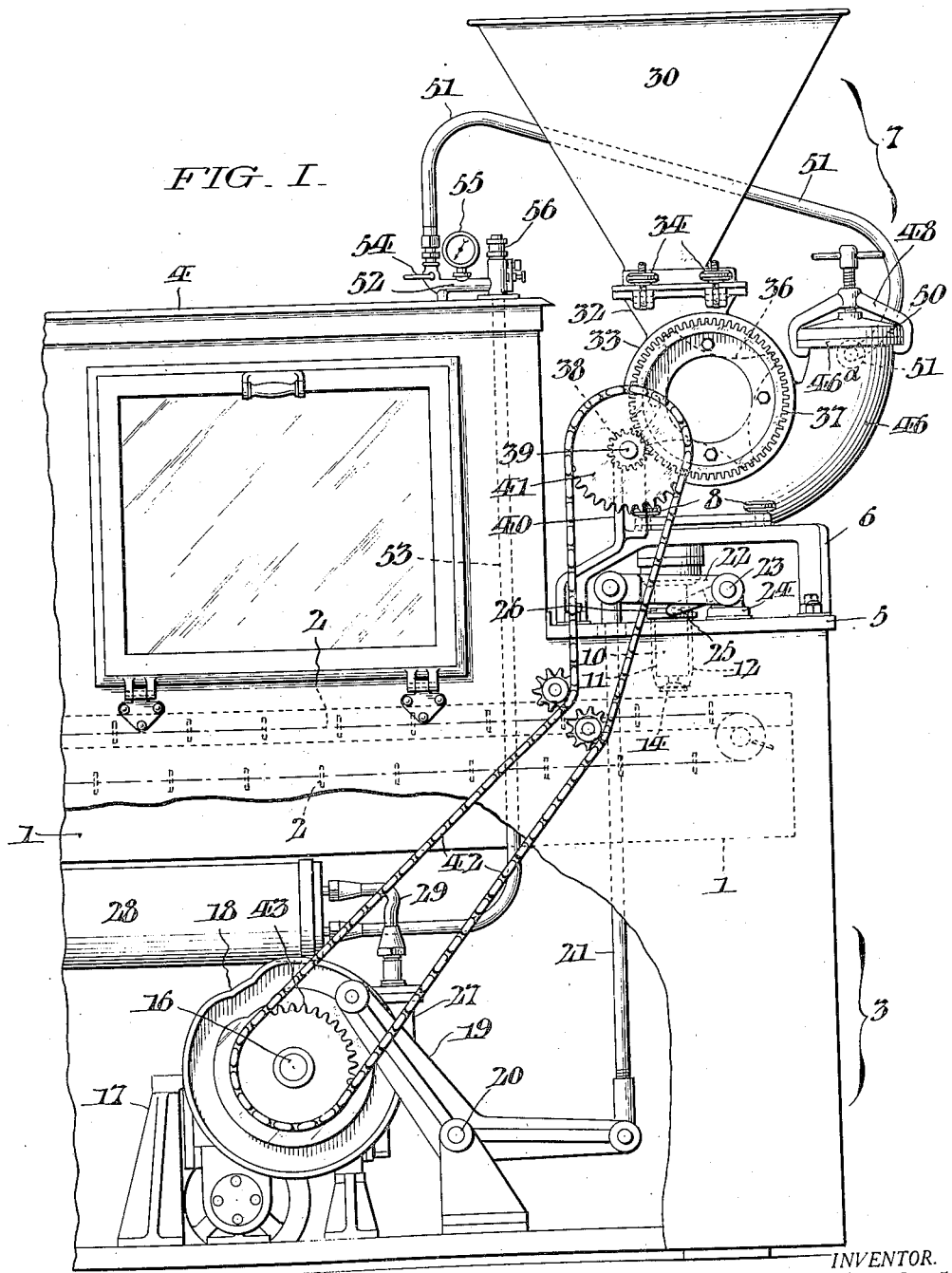

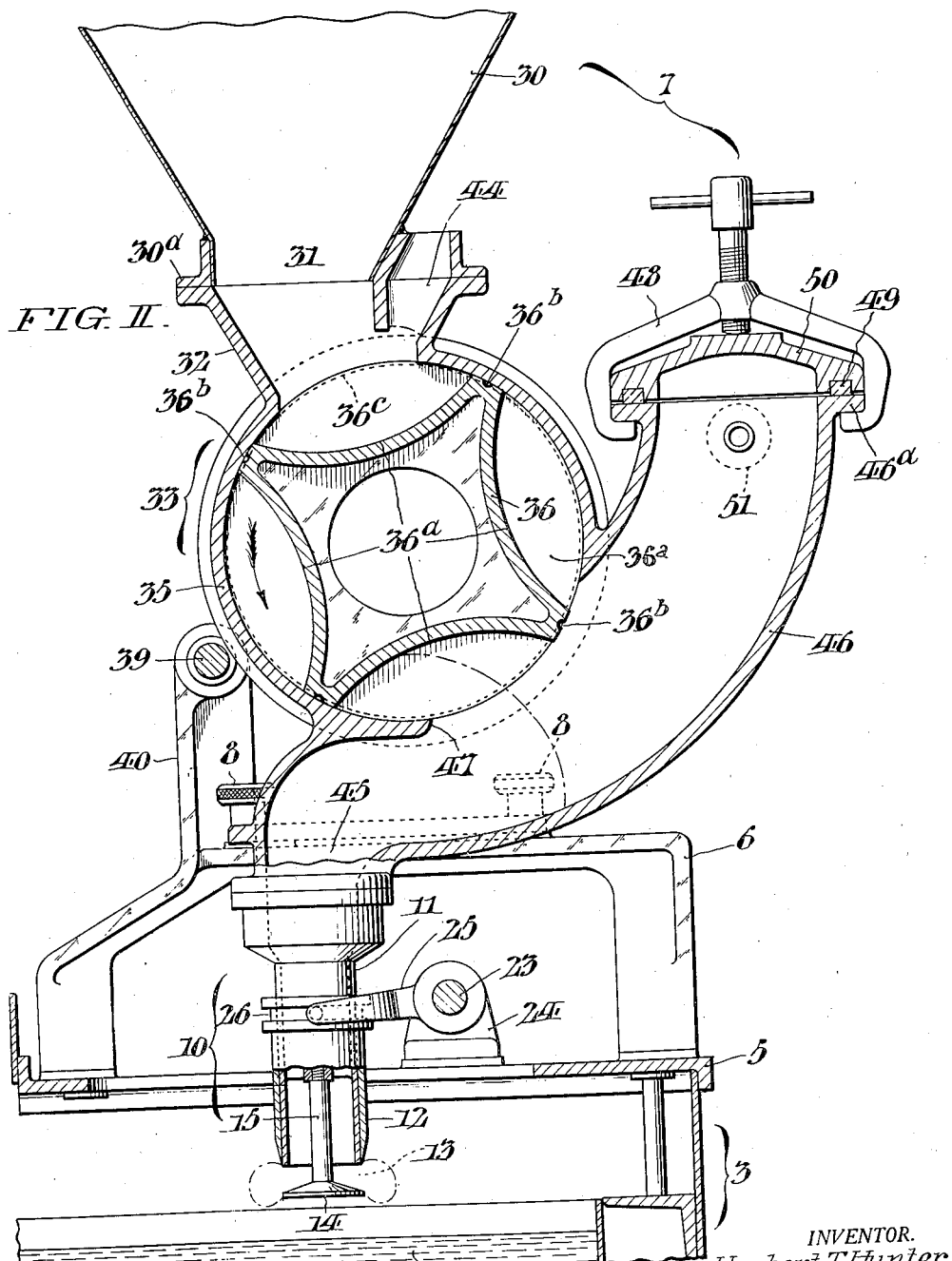

1,854,148

UNITED STATES PATENT OFFICE

HERBERT T. HUNTER, OF BALTIMORE, MARYLAND, ASSIGNOR TO DOUGHNUT MACHINE CORPORATION, OF NEW YORK, N. Y., A CORPORATION OF NEW YORK

ALIMENTARY PRODUCT FORMING DEVICE

Application filed December 12, 1930. Serial No. 501,784.

This invention relates to devices for forming alimentary products from plastic material; and it is more particularly concerned with means for producing annular formations such as doughnuts from batter.

The quality of doughnuts is dependent to a great extent upon the amount of working or mechanical agitation that the dough receives incident to mixing, as well as incident to conversion into the customary annular formations just before frying. In other words, dough unduly worked results in a correspondingly tough and heavy product as compared with doughnuts made from batter in connection with the mixing and forming of which extreme care is exercised to avoid excessive agitation. To this end, means have been devised heretofore, as exemplified in U. S. Patents Nos. 1,492,542 of April 29, 1924 and 1,559,729 of November 5, 1925 granted respectively to John C. Bergner and Frank E. Morris, wherein compressed air is employed to expel batter from a sealed receiver through a die outlet to form the doughnuts. The forming devices of the patents referred to are however open to the objection that it is necessary to suspend their operation at intervals to replenish the dough, and furthermore in that delays are entailed after replenishing of the dough to permit the air pressure to build up to a predetermined point necessary to insure formations of uniform size.

My invention has for its object to overcome the drawbacks of previous practice to which attention has been directed; and this desideratum I attain through provision of a forming device in which an open continuous feed gravity hopper is combined with means in connection with which air pressure is utilized in expelling the dough or batter through a die outlet to define annular formations.

In the attached drawings, Fig. I is a fragmentary side elevation of a typical straight-away automatic doughnut machine fitted with a continuous feed pneumatic doughnut forming device conveniently embodying my invention; and, Fig. II is a vertical sectional view of the device drawn to a larger scale.

The doughnut machine herein partially delineated for the purpose of illustrating the use of my improved forming device is of a typical straight-away type embodying an elongated receptacle 1 for the cooking liquor in which the raw doughnuts are slowly progressed incident to cooking by a conveyor indicated at 2. The working parts of the machine are enclosed in a casing 3 whereof the upper part 4 extends over the top of the receptacle 2 to confine the fumes rising from the cooking liquor, the said fumes being carried off by suitable exhausting means not illustrated. At one end, the skeleton framework of the machine affords a shelf 5 to support a table-like bracket 6 whereto the forming device constituting the present invention and designated comprehensively by the numeral 7 is detachably secured by means of thumb screws 8. Associated with the forming device 7 is a conventional type of annular die means 10 which is similar to that shown and described in the two patents hereinbefore referred to and comprises a tubular outlet member 11 whereon a cutter sleeve 12 is guided for axial movement. Incident to downward movement, this cutter sleeve 12 serves to sever dough extruded through an annular opening 13 formed between the lower edge of the tubular member 11 and a cutter disk 14 supported by a stem 15 from within the said tubular member, as shown in Fig. II. The cutter sleeve 12 is intermittently actuated by mechanism including a constantly driven shaft 16 which is supported for rotation by a bearing structure 17 within the casing 3 below the receptacle 1. As shown, the shaft 16 carries a rotary cam 18 which communicates rocking movement to a bell crank lever 19 fulcrumed to swing on a fixed center 20. By means of a vertical link 21 the bell crank lever 19 is coordinated with an arm 22 on a shaft 23 having journal support in brackets 24 on the top of the shelf 5. The shaft 23 also carries a bifurcate arm 25 provided at the ends of its extremities with inwardly projecting studs to engage a circumferential groove 26 in the cutter sleeve 12.

The machine also embodies an air compressing pump 27 which is driven, through suitable gearing not shown, from the shaft 16, and which delivers to an equalizing receiver 28 by way of a pipe connection 29.

Referring now in detail to the forming device 7, it will be noted that the same comprises an open top hopper 30 with suitably inclined sides for continuous gravity feeding of the dough through a bottom outlet 31. The hopper 30 is in the present instance constructed with a sheet metal body and the said body provided at the bottom with a base flange 30a to rest on the top of the upward mouth extension 32 of a casing 33, it being secured with capacity for ready detachment, by means of wing bolts 34. As shown to best advantage in Fig. II, the casing 33 has a horizontal cylindric portion 35 wherein is housed a rotor 36 having a series of arcuate circumferential recesses or pockets 36a, which, as they pass the bottom outlet 31 of the hopper 30, successively receive charges of dough from the latter. The rotor 36 is continuously rotated in proper timed relation with actuation of the die mechanism 10 by means including a gear wheel 37 which is secured to one end of the rotor and which meshes with a pinion 38 whereof the shaft 39 is journaled in upward reaching arms 40 of the table structure 6, see Fig. I. The shaft 39 also carries a sprocket wheel 41 for coordination by means of a chain 42 with a similar sprocket 43 on the shaft 16 previously mentioned. Referring again to Fig. II, the rotor casing 33 is provided at the top adjacent the hopper outlet 31 with a vent opening 44 which permits escape of air as the pockets 36a of the rotor 36 are filled with dough from the hopper 30. It will be further noted from Fig. II that the rotor casing 33 is provided with a bottom outlet 45 that leads to the tubular outlet member 11 of the die means 10, and adjacent said bottom outlet 45 with a lateral elbow-like enlargement 46 which in turn communicates with the rotor bore of the casing 33 through a port 47. At the top, the enlargement 46 is formed with a flange 46a whereto is clamped, by means of a screw yoke 48 and with interposition of a sealing gasket 49, of a cover 50, to the end that the said enlargement is converted into an air-tight chamber. By means of a flexible hose 51, the hollow of the enlargement is connected, as shown in Fig. I, with a fitting 52 on the top of the machine casing 4, the said fitting being in turn connected, by means of a vertical pipe 53 with the air receiver 28 beneath the cooking receptacle 1. The fitting 52 just referred to also affords connection for a hand valve 54, a pressure gage 55 and bleed valve means 56, the latter being regulatable to maintain a predetermined pressure in the air system. To insure against leakage of air the rotor 36 is formed with lengthwise extending grooves 36b as well as with circumferential end grooves 36c into which dough may pack so as to seal with the cylindric bore of the rotor casing 33.

The operation of the device is as follows:—

Considering the rotor 36 to be revolving in the direction of the arrow in Fig. II, it will be seen that as each pocket 36a thereof passes the mouth 31 of the hopper 30, the air displaced incident to gravitation of dough into such pocket, is permitted to escape through the vent outlet 44 with assurance of complete filling of each successive pocket 36a with dough. The charge of dough so received is carried around within the cylindric bore of the rotor casing 33 to the port 47 and deposited into the lower portion of the enlargement 46, it being removed from the rotor pocket by action of the static head of compressed air within said enlargement and urged toward the bottom outlet 45 of the rotor casing 33 for advance into the tubular member 11 of the die means 10. An amount of dough corresponding to each charge so deposited within the outlet 45 is expelled through the annular die opening 13 between the end of the tubular outlet member 11 of the die means 10 and the cutter disk 14, and subsequently severed by descent of the sleeve 12, with formation of a ring, which, as it is released, drops into the cooking liquor within the receptacle 1 for progression by the conveyor 2.

From the foregoing it will be seen that my improved pneumatic forming device is simple in construction, as well as reliable and efficient in operation, and moreover capable of continuous operation since its open top supply hopper 30 is always readily accessible for the purposes of dough replenishment.

Having thus described my invention, I claim:

1. An aliment forming device comprising an open continuous feed gravity discharge dough hopper; means to receive and trap unit quantities of dough from the hopper; and air pressure means communicating into the dough receiving means instrumental in expelling the successively trapped units of dough through a forming die outlet.

2. An aliment forming device comprising an open continuous feed gravity discharge dough hopper; a rotor revolvable in a casing beneath the hopper, the said rotor having circumferential pockets to receive and trap unit quantities of the dough from the hopper; and communicating air pressure means instrumental in expelling the trapped units of dough successively through a forming die outlet at the bottom of the rotor casing.

3. An aliment forming device comprising an open continuous feed gravity discharge dough hopper; a rotor adapted for continuous revolution in a casing beneath the hopper, the said rotor having circumferential pockets to receive and trap unit quantities of dough from the hopper; and connected air pressure means instrumental in expelling the trapped units of dough successively through a forming die outlet at the bottom of the rotor casing.

4. An aliment forming device comprising an open continuous feed gravity discharge dough hopper; a pocketed rotor adapted to receive and trap, from the hopper, unit quantities of dough; and a casing for the rotor having a connected die outlet therebelow, an enlargement in communication with a source of air pressure whereby the unit quantities within the pockets of the rotor are successively expelled through said die outlet.

5. An aliment forming device comprising an open continuous feed gravity discharge dough hopper; a rotor revolvable in a casing beneath the hopper, the said rotor having circumferential pockets adapted to receive unit quantities of dough; provisions for escape of air displaced from the rotor pockets by the dough at the time of filling; and connected air pressure means instrumental in subsequently expelling the trapped units of dough from the rotor pockets through a forming die outlet at the bottom of the rotor casing.

6. An aliment forming device comprising an open continuous feed gravity discharge dough hopper; a rotor revolvable in a casing beneath the hopper, the said rotor having circumferential pockets adapted, as they pass a bottom outlet of the hopper, to receive unit quantities of dough; an escape passage leading from the top of the rotor casing adjacent the hopper outlet for air displaced from the rotor pockets by the dough incident to filling; and connected air pressure means instrumental in subsequently expelling the trapped units of dough from the pockets of the rotor through a forming die outlet at the bottom of the rotor casing.

7. An aliment forming device comprising an open continuous feed gravity discharge dough hopper; a rotor revolvable in a casing beneath the hopper, the said rotor having circumferential pockets to receive and trap unit quantities of dough from the hopper; connected air pressure means instrumental in expelling the trapped units of the dough successively through an outlet at the bottom of the rotor casing; and die means timed with the rotor for severing the unit quantities of the dough expelled through the casing outlet.

8. An aliment forming device comprising an open continuous feed gravity discharge dough hopper; a rotor revolvable in a casing beneath the hopper, the said rotor having circumferential pockets to receive and trap unit quantities of dough from the hopper; connected air pressure means instrumental in expelling the trapped units of dough successively through an outlet at the bottom of the rotor casing; normally open die means associated with said outlet; and means timed with the rotor for intermittently closing the die means to sever the dough expelled through the casing outlet.

9. An aliment forming device comprising an open continuous feed gravity discharge dough hopper; a rotor revolvable in a casing beneath the hopper, said rotor having circumferential pockets to receive and trap unit quantities of dough from the hopper; connected air pressure means instrumental in expelling the trapped units of dough successively through an outlet at the bottom of the said casing; normally open annular die means associated with said outlet; and means for intermittently closing the die means to sever annular formations resultant upon expulsion of the dough through the casing outlet.

10. An aliment forming device comprising an open continuous feed gravity discharge dough hopper; a rotor revolvable in a casing beneath the hopper, the said rotor having circumferential pockets to receive unit quantities of dough from the hopper; provisions for escape of air displaced from the rotor pockets by the dough at the time of filling; connected air pressure means instrumental in subsequently expelling the trapped units of dough successively through an outlet at the bottom of the rotor casing; and die means timed with the rotor for severing the unit quantities of dough expelled through the casing outlet.

In testimony whereof, I have hereunto signed my name at Ellicott City, Maryland, this 8th day of December 1930.

HERBERT T. HUNTER.